United States Patent
Wang et al.

(10) Patent No.: US 12,189,506 B1
(45) Date of Patent: Jan. 7, 2025

(54) TWO-PHASE LOG ANOMALY AGGREGATION FRAMEWORK

(71) Applicant: Amazon Technologies, Inc., Seattle, WA (US)

(72) Inventors: Xiao Wang, Kirkland, WA (US); Jasmeet Chhabra, Sammamish, WA (US); Yuyang Wang, Belmont, CA (US); Willem Conradie Visser, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/082,521

(22) Filed: Dec. 15, 2022

(51) Int. Cl.
*G06F 11/30* (2006.01)
*G06F 11/07* (2006.01)

(52) U.S. Cl.
CPC ...... *G06F 11/3082* (2013.01); *G06F 11/0772* (2013.01); *G06F 2201/835* (2013.01)

(58) Field of Classification Search
None
See application file for complete search history.

(56) References Cited

U.S. PATENT DOCUMENTS

| | | | | |
|---|---|---|---|---|
| 11,200,132 | B1 * | 12/2021 | Liu | G06F 13/4221 |
| 2017/0277727 | A1 * | 9/2017 | Chen | G06F 16/215 |
| 2020/0089590 | A1 * | 3/2020 | Togawa | G06F 11/0709 |
| 2021/0406106 | A1 * | 12/2021 | Moss | G06F 11/0706 |
| 2023/0078713 | A1 * | 3/2023 | Neuvirth | H04L 63/1416 |
| | | | | 726/23 |

OTHER PUBLICATIONS

Amazon, "Amazon DevOps Guru User Guide," p. 5, 2023, 107 pages.
Amazon, "Amazon Cloud Watch User Guide," 2023, 1249 pages.

* cited by examiner

*Primary Examiner* — Mohamed Ibrahim
(74) *Attorney, Agent, or Firm* — Davis Wright Tremaine LLP

(57) ABSTRACT

Systems and methods are described relating to aggregating log anomalies. In some examples, a plurality of log anomaly instances may be obtained, from a log anomaly detector, where individual instances are associated with a first log anomaly type and a first anomalous log event. Log anomaly instances associated with the first log anomaly type and the first anomalous log event may be combined into a first log anomaly class. The first log anomaly class may be combined with a second log anomaly class, including log anomaly instances associated with the first anomalous log event and a second log anomaly type, into a log anomaly group, which may correlate the occurrences of the first and second anomaly types to the same first anomalous log event over a period of time. An indication of the log anomaly group may then be output.

20 Claims, 10 Drawing Sheets

| | |
|---|---|
| Log Anomaly instance 402 | |
| Log anomaly type 404 | Keyword anomaly |
| Log anomaly sub-type 406 | AccessDeniedException |
| Timestamp 408 | '1658971260000' |
| Anomalous log event 410 | 'botocore.exceptions.ClientError: An error occurred (AccessDeniedException) when calling the FilterLogEvents operation' |
| Event type ID 412 | kj490dfs |
| Anomalous token location 414 | Kj490dfs[4][0[ |

FIG. 4

| Log Anomaly Class 502 ||
|---|---|
| Anomaly class ID 504 | Unique class ID for each combination of 'log anomaly type', 'log anomaly sub-type', 'event type ID' and 'anomalous toke location' |
| Log anomaly type 506 | same as the `log anomaly type` of the anomaly instance |
| Log anomaly sub-type 508 | same as the `log anomaly sub-type` of the anomaly instance |
| Event type ID 510 | obtained from the anomaly instance or generated using an online log parser |
| Occurrence count 512 | Initialized as 1 |
| First occurrence timestamp 514 | initialized as the `timestamp` of the anomaly instance |
| Log-event sample 516 | initialized as the `anomalous log event` of the anomaly instance |

FIG. 5

| Log Anomaly Showcase 602 | |
|---|---|
| Anomaly Showcase ID 604 | Unique ID for the showcase (a hash value from the 'Log event sample') |
| Log-event sample 606 | 'Anomalous log event' of the anomaly instance |
| First occurrence timestamp 608 | 'Timestamp' of first occurrence of anomaly instance of showcase |
| Occurrence count 610 | Number of occurrences of anomaly instance of showcase |
| Anomaly class list 612 | List of anomaly classes that are grouped into this anomaly showcase |

FIG. 6

TWO-PHASE LOG ANOMALY AGGREGATION FRAMEWORK

BACKGROUND

Logs are machine-generated records that depict run-time system behaviors, which form a critical data source for system monitoring and trouble shooting. In many cases, operators rely heavily on logs to analyze the root cause of operational issues to determination remediation actions to address the various operational issues. However, manual log analysis is often error-prone, time consuming, and relies on human experience and domain expertise. As such, automatic log analysis, such as machine learning (ML) based log anomaly detection systems, are in great demand in the industry. When an operational issue happens, systems typically generate different patterns in the logs compared to the logs generated in the normal operating state of the system. These different log patterns may be generally referred to as log anomalies. The number of logs anomalies generated by a system may be quite large. However, these log anomalies are usually highly repetitive and redundant. Surfacing the detected log anomalies directly to the users without some type of filtering can lead to users being overwhelmed and being unable to extract the most usefully information from the log anomalies in a timely manner.

BRIEF DESCRIPTION OF THE DRAWINGS

Various techniques will be described with reference to the drawings, in which:

FIG. 4 illustrates an example data structure of a log anomaly instance, according to at least one embodiment;

FIG. 5 illustrates an example data structure of a log anomaly class, according to at least one embodiment;

FIG. 6 illustrates an example data structure of a log anomaly showcase or group according to at least one embodiment;

DETAILED DESCRIPTION

Figure 1:
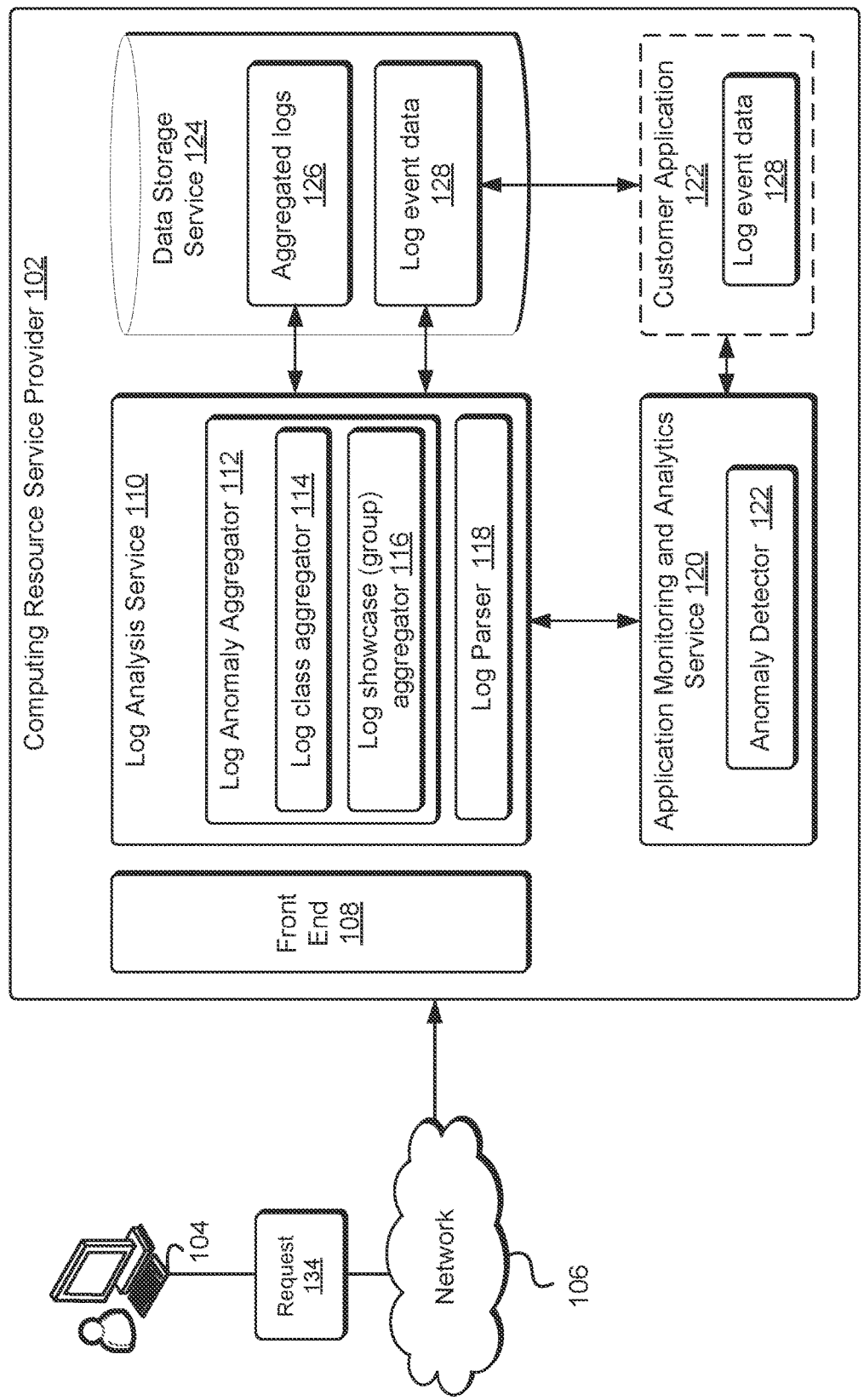
FIG. 1 illustrates an example environment in which the described techniques can be practiced, according to at least one embodiment.

Various systems and methods are described herein relating to aggregating log events, and more specifically aggregating log anomaly events. The described systems and techniques address the problem of aggregation, including how to effectively merge the log anomalies detected from a log anomaly detector and show the log anomaly information in a structured and aggregated way to reduce redundancy. In some cases, the described techniques may utilize a two phase aggregation framework. The first phase may merge log anomaly instances which are the outputs of the log anomaly detector into log anomaly classes, where each anomaly class represents an unique kind of anomalous log pattern that may appear multiple times in the logs when an operational issue occurs. The second phase merges log anomaly classes into log anomaly showcases, where multiple log anomaly classes are grouped together as a single showcase if they can be demonstrated together using the same sample log event. In this way, redundant log events, specifically those that indicate anomalies, can be combined and summarized in a more succinct and useful way, to enable operators to identify and resolve the anomalies in an application. The described techniques may be utilized to monitor any customer application or compute process. In some cases, the descried log anomaly aggregation process may take as an input a collection of log anomalies, such as may be identified and/or curated by an application monitoring and analysis service.

In some examples, the aggregation process or service may obtain a set of log anomaly instances from a log anomaly detector, where individual log anomaly instances include at least a log anomaly type and an anomalous log event (e.g., a sample or copy of the event log indicating the anomaly). The aggregation process may then perform a first aggregation phase by combining log anomaly instances associated with the same log anomaly type and the same anomalous log event into one of a number of log anomaly classes. In some examples, each log anomaly class may include or be associated with the following pieces of data: a first appearance timestamp indicating a time at which the anomalous log event first occurred, and an occurrence count indicating how many times the anomalous log event occurred. Next, the aggregation process may perform a second aggregation phase by combining log anomaly classes that are associated with the same appearance timestamp, the same first occurrence count, and the same anomalous log event count into a log anomaly showcase. In some examples, the log anomaly showcase represents the aggregation of multiple occurrences of the same first anomalous log event that is associated with at least two different log anomaly types over a period of time, in a condensed format. The aggregation process may then output an indication of the log anomaly showcase, to enable operates to interact with the showcase to inform changes to be made to the application be monitored to resolve the anomalies.

In some cases, individual log anomaly instances are associated with a timestamp indicating a time at which the an anomalous log event occurred. In these cases, the first appearance timestamp of each of the log anomaly classes may be determined based at least in part on the timestamps of the log anomaly instances aggregated into each of the log anomaly classes. In some cases, individual log anomaly instances further comprise an event type ID that indicates an event type of the anomalous log event. Combining the log anomaly instances into classes may include combining log anomaly instances having he same event type ID as well. In some cases, where a log anomaly instance is not associated with an event type ID, the described techniques may generate an event type ID for the log anomaly instance and associate the event type ID with the log anomaly instance.

In yet some cases, the event type ID may be generated by a separate system, such as by a log parser. In yet some examples the aggregation process may additionally generate and associate a class ID with each of the log anomaly classes. The class ID may be unique for each combination of the first appearance timestamp, the occurrence count, and the event type ID. In these examples, the log anomaly showcase may include classes having different anomaly class IDs.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) more robust and efficient anomaly detection and representation of anomalies to operators through intelligent aggregation, 2); more efficient resolution of anomalies within an application or process; and 3) other benefits and advantages that are described throughout this disclosure.

FIG. 1 illustrates an example environment 100 in which an log anomaly analysis service 110 and an application monitoring and analytics service 120 may be provided by a computing resource service provider 102. A client 104 may interact with the computing resource service provider 102 via a front end 108 of computing resource service provider 102 over one or more networks 106 to interact with various data and services, such as through one or more of a customer application 122, a log anomaly analysis service 110, an anomaly detection service 120, a data storage service 124, and/or other services, as will be described in greater detail below.

Client 104 may refer to a client computer system or computing device connected to a server (e.g., computing resource service provider) over a network 106. In some cases, client 104 refers to a user or operator of a client computer system, and may be an employee of an organization that utilizes a computing resource service provider 102 to interact with various forms of data, such as through one or more of a customer application 122, a log anomaly analysis service 110, an anomaly detection service 120, a data storage service 124, and/or other services.

Client 104 may submit a request 134 to access or interact to various computing resources (e.g., services or computing resources thereof) of computing resource service provider 102. The request 114, in some examples, is a web service application programming interface request (also referred to simply as a web service request), may be received by a service of the computing resource service provider 102. As illustrated, the client 104 may submit a request 134 to access or log anomaly data generated by an anomaly detection service 120 monitoring a customer application 122, which may be provided by or through the computing resource service provider 102. In some cases, the client 104 may access aggregated anomaly log data, such as may be generated or filtered by the log anomaly analysis service 110. The request 134 may be directed to one or more services provided by the computing resource service provider 102, and may include a request to access data and anomaly data relating a customer application 122.

In some examples, request 134 may include one or more of: a source of log data to monitor (e.g., an endpoint of customer application, such as may be provided by the computing resource service provider 102, or may be external or not associated with the computing resource service provider 102), configuration parameters for what type of anomalies to the anomaly detection service should monitor for, a request to access aggregated logs, and various other interactions as may be related to configuring, accessing, and resolving anomalies generated by an application or process.

In some cases, the front end 108 may receive the request 134 and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of a customer application 122, a log anomaly analysis service 110, an anomaly detection service 120, a data storage service 124, and/or other services offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106. In an embodiment, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 10. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of a customer application 122, a log anomaly analysis service 110, an anomaly detection service 120, and a data storage service 124 . . . . Each of these services may provide ways for a customer to interact with various forms of data, including using the one or more services to detect anomalies in the data.

In some cases, client device 104 may configure the anomaly detection service 120 to detect anomalies within log event data 128 generated by a customer application or process 122. Customer application or process 122 may be a collection of computing resources that can include any type of application or process that may generate log data. In some cases, the customer application 122 may push or otherwise communicate log event data 128 to an anomaly detection service 120. In other cases, the anomaly detection service may pull the log event data 128 from the customer application 122. In yet other cases, the anomaly detection service may obtain the log event data from a data storage service 124, such as after a customer application 122 has stored the log event data 128 with the data storage service 124. The log event data 128 may take any of a variety of forms, include various attributes, data fields, etc., that may identify events, metrics, or other values relating to operation of customer application 122.

In some aspects, the anomaly detection service 120 may be a collection of computing resources configured to analyze data, such as obtained and/or monitored from a data source, such as a customer application or process 122, on behalf of a customer 104 to detect anomalies within that data. In some aspects, the anomaly detection service 120 may generate or access one or more models, such as machine learning models, neural networks, etc., to be used in detecting anomalies within, for example, log event data 128 generated by the customer application 122. In some cases, the anomaly detection service 120 may interact with any of a variety of other services, such as may be provided by the computing resource service provider 102, to detect anomalies within log event data 128. In some cases, a data source (not illustrated) may reside in another service, such that the anomaly detection service 120 may receive data from the other service for analysis. In yet some cases, the anomaly detection service 120 may obtain metrics or other metadata of certain customer data, from another service to be used in detecting anomalies within the data of interest. In other examples, the anomaly detection service 120 may obtain data from a data source external to the computing resource service provider 102.

In some aspects, the anomaly detection service 120 (via appropriately configured and authenticated API calls) may provision and/or access virtual computer systems that are instantiated on physical computing devices hosted and operated by the computing resource service provider 102. The virtual computer systems may be used for various purposes, such as to operate as servers supporting data storage for a customer coupled with compute capabilities to search, query, access, and perform other operations on the customer data, such as to aid in creating models, and detecting anomalies or anomalous behavior within that data, such as log event data 128. The anomaly detection service 120 may be configured to detect one or more anomalies across one or multiple metrics, dimensions, or values. In some aspects, the anomaly detection service 120 may be configured to detect specific types or classes of anomalies, such as across one or multiple specific metrics. In other examples the anomaly detection service 120 may be configured to detect a variety of different types of anomalies across a wide variety of dimensions or metrics. In some cases, anomaly detection service 120 may monitor REST APIs, URLs, and website content, checking for unauthorized changes from phishing, code injection and cross-site scripting, and various other indications of events recorded by one or more applications, services, etc. Anomaly detection service 120 may monitor detect anomalies within log event data 128 with or without modifying the data in the log event data 128.

Based on the log event data 128 and/or configuration parameters received from client device 104, the anomaly detection service 120 may select one or more models to use in detecting anomalies within data. Types of anomalies and alarms differ between types of values or metrics, types of applications, etc. Annotating anomalies with types allows for the flexibility to pick the right type of anomalies based on the metric and/or user feedback. User feedback and unique metric requirements are used to adjust what model is used (for example, based on an annotation of a data set, anomaly, etc.), retrain a model, set different thresholds for reporting, etc. For example, user feedback may be used to: adjust importance of an anomaly or insight of the anomaly, adjust what type of anomalies are used to create an insight for a metric, etc. For example, if a user gives feedback that seasonal anomalies are not useful for a certain metric, those anomalies are muted. To get better feedback, the type of anomaly is used to generate explanations which are shown the user. For example, if the anomaly is due to trend changes, the user may be shown the explanation of how the trend changed. Domain knowledge may be used to annotate metrics and select which models are used by the anomaly detection service 120 to create anomalies and rules used for threshold-based anomalies. Domain knowledge may also be used to determine when to alarm on an anomaly. In some examples, the anomaly detection service 120 may be an on-demand service. For example, when metric anomalies are detected, anomaly detection service 120 may automatically find relevant log groups or subsets of logs from log event data 128 by analyzing the log event data 128. Log anomaly detection may then be performed on each of the relevant log groups and the detected log anomalies may be analyzed and aggregated by the log anomaly analysis service 110 to output aggregated log anomaly showcases to help users troubleshoot the operational issues, as will be described in greater detail below.

In some cases, the output of the log anomaly analysis service 110 may be configurable, such as by user device 104 via parameters or selections included in request 134 and/or further communications between user device 104 and the log anomaly analysis service 110. In some cases, the log anomaly analysis service 110 may output varying levels of detail and various aggregations of log anomaly instances, such as based on selectable options selected by user device 104. In some cases, the log anomaly analysis service 110 may provide a dashboard or other user interface or graphical user interface (GUI) to enable the user device 104 to interact with, configure, and initiative jobs with the log anomaly analysis service 110. In some cases, the GUI may provide or varying levels of aggregation of log anomaly instances, such as summarizing only identical log anomaly events, summarizing log anomaly classes, summaries of log anomaly groups or showcases, or various combinations thereof. In some cases, the output of the log anomaly analysis service 110 may correspond to an output selection received from the user device 104, such as outputting showcases, classes, individual anomaly instances, or various combinations thereof.

In some cases, the output of the log anomaly analysis service 110 may include a hierarchical representation of the different groupings of log anomaly instances. In these examples, showcases or groups may be displayed by default. Upon receiving a selection of a showcase/group, the showcase may be expanded to provide a visualization (or some type or representation) of the different log anomaly classes grouped into the showcases. Similarly, upon receiving a selection of a log anomaly class, the individual instances that are contained within the class may be displayed (or some type of representation thereof presented to the user) through the GUI. In other examples, varying other visualization schemes may be employed to present the various grouping of log anomaly instances to a user, to aid the user in identifying, addressing, and/or resolving the underlying causes of the anomalies.

In some examples, the computing resource service provider 102 may provide a log anomaly analysis service 110. The log anomaly analysis service 110 may be a collection of computing resources that aggregates log anomaly instances, such as obtained from an anomaly detection service 120. In some cases, the log anomaly analysis service 110 may include a log anomaly aggregator 112 and/or a log parser 118. The log aggregator 112 may be a collection of computing resources that aggregates log anomaly instances based on common attributes of thee log anomaly instances. In some cases, the log anomaly aggregator 112 may include a log anomaly classifier or class aggregator component or process 114. The log anomaly class aggregator 114 may obtain various log anomaly instances and sort them into one or multiple classes, such as based on log anomaly type and/or sub-type, the anomalous log event associated with the instance (e.g., the data contained in the log event itself), and/or various other pieces of information associated with individual log anomaly instances. In some cases, the log anomaly class aggregator 114 may combine log anomaly instances that have the same event type ID, which may identify the event type form the log event data 128 that indicates the anomaly. The log anomaly class aggregator 114 may obtain the log anomaly instance from the anomaly detection service 120 and format and/or modify the log anomaly instance so that it conforms to a standard data structure usable by the log anomaly aggregator 112. In some cases, this may include generating one or more fields or identifiers, as will be described in greater detail below in reference to FIGS. 4 and 5 below. Examples of the aggregation process performed by the log anomaly class aggregator 114 will be described in greater detail below in reference to FIGS. 2, 7, and 9.

In some cases, the log anomaly aggregator 112 may also include a log anomaly showcase or group aggregator component or process 116. The log anomaly showcase or group aggregator 116 may obtain different classes of log anomaly instances and combine or aggregate different classes that meet certain criteria or conditions. In some cases, the log anomaly showcase or group aggregator 116 may aggregate two or more classes into a group or showcase, such as where multiple log anomaly classes are grouped together as a single showcase if they can be demonstrated together using the same sample log event (e.g., the same log event that indicates two different types or sub-types of anomalies). An example of a data structure of an anomaly showcase or group will be described below in greater detail in reference to FIG. 6. Examples of the aggregation process performed by the log anomaly showcase or group aggregator 116 will be described in greater detail below in reference to FIGS. 2, 8, and 9.

The log parser 118 may be a collection of computing resources that generates various data for a log anomaly instance or related thereto, such as an event type ID, for a log anomaly instance. In some cases, the log parser 118 may generate or combine different attributes or data associated with a log anomaly instance to aid in identifying, aggregating, and/or storing or accessing different log anomaly data. In some cases, the log parser 118 may be a process provided by the log anomaly analysis service 110. In other cases, the log parser 118 may be part of a separate service or system, such as may or may not be provided by the computing resource service provider 102.

In some examples, the computing resource service provider 102 may provide data storage through a data storage service 124 to store and manage large volumes of data, including log event data 128 and aggregated anomaly data 126. In some cases, the data storage service 124 may interact with the log anomaly analysis service 110, the anomaly detection service 120, and/or customer application 122 to enable detection and/or generation of metrics relevant to data stored by the data storage service 124. Data storage service 124 may be an on-demand data storage service, such as an object-based data storage service, and may be configured to store various forms of media. The data storage service 124 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein.

In some examples, data stored in the data storage service 124 may be organized into data objects, in one or more logical data containers. The data storage service 124 may include one or more data objects, which may have arbitrary sizes and may, in some instances, have constraints on size. Thus, the data storage service 124 may store numerous data objects of varying sizes. The data storage service 124 may operate as a key value store that associates data objects with identifiers of the data objects which may be used by the client 104 to retrieve or perform other operations in connection with the data objects stored by the data storage service 124. Access to the object-based data storage service 124 may be through application programming interface (API) calls to the service or via an interface, such as a graphical user interface (GUI).

In some cases, the data storage service 124 may operate as a key value store that associates data objects with identifiers of the data objects which may be used by the client 104 to retrieve or perform other operations in connection with the data objects stored by the data storage service 124. Access to the data storage service 124 may be through application programming interface (API) calls to the service, for example from either directly from client 104, or via the computing resource service provider 102. It should be appreciated that the data storage service 124 may additionally or alternatively provide non-object based data storage, such as block data storage, table-oriented data storage, relational databases, file-based storage, and the like. The data storage service 124 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

Figure 2:
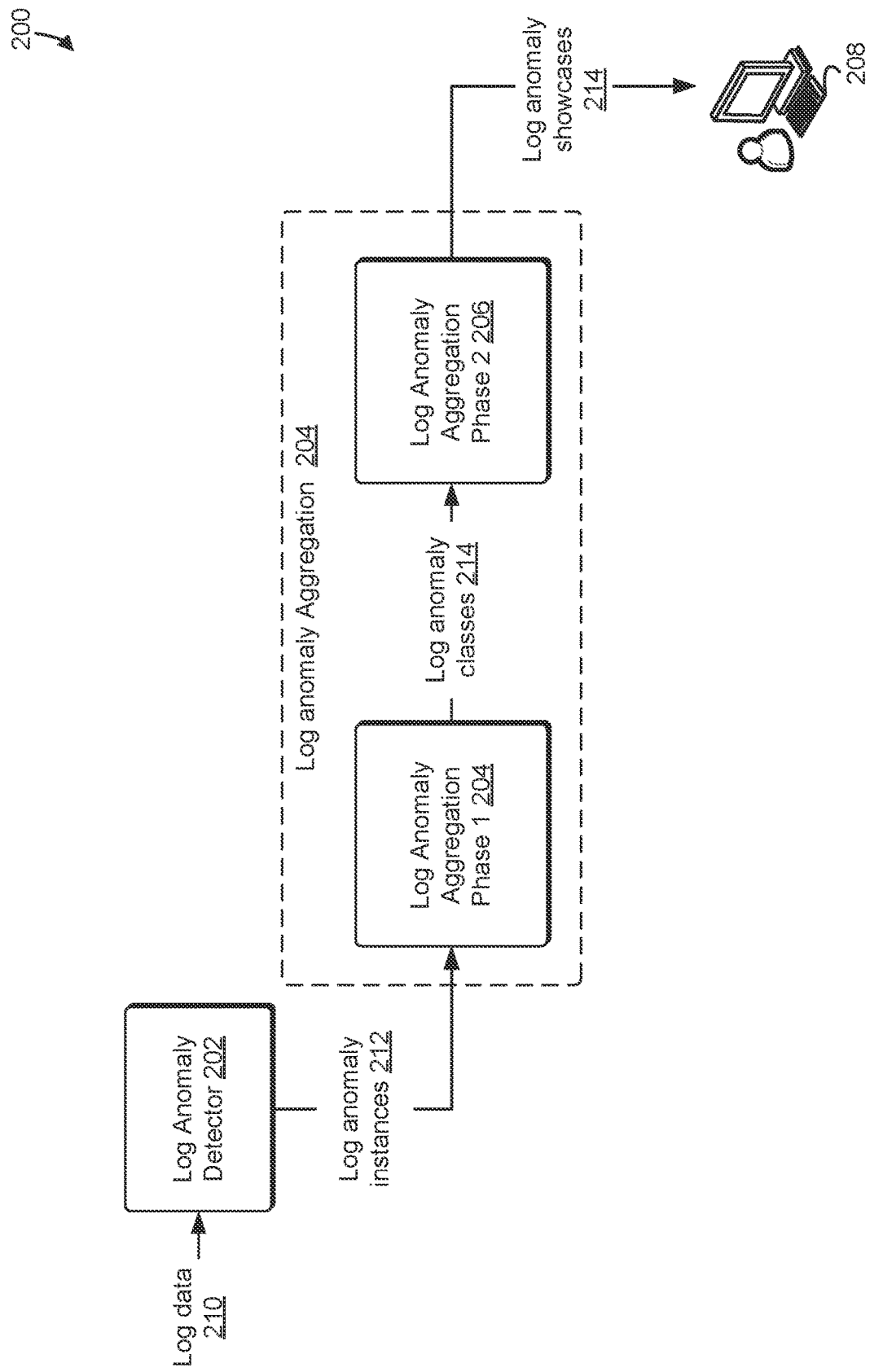
FIG. 2 illustrates an example two phase process diagram for aggregating log anomalies into one or more groups or showcases, such as may be performed by the system of FIG. 1 according to at least one embodiment.

FIG. 2 illustrates an example two phase process diagram 200 for aggregating log anomalies into one or more groups or showcases. In some cases, process 200 may be performed by the log anomaly analysis service 110 described above in reference to FIG. 1. In a specific example, process 200 may be performed by one or more component of the log anomaly analysis service 110, such as by the log anomaly aggregator 112, the log anomaly class aggregator 114, the log anomaly showcase aggregator 116, and/or the log parser 118, and/or by the anomaly detection service 120.

Process 200 may begin with a log anomaly detector 202, such as may be an example of or provide by the anomaly detection service 120 described above, obtain various log data 210, such as from a customer application 122. The log data 120 may be an example of log event data 128. The log anomaly detector may analyze the log data 210 and output a subset of the log data as log anomaly instances 212, which may be individual log events that have been identified as satisfying one or more criteria for being anomalous. In some cases, the log anomaly instances 212 may be modified from the log data to include one or more pieces of data to identify attributes of the log data that indicate an anomaly. An example of a log anomaly instances 212 will be described below in reference to FIG. 4. The log anomaly instances 212 may then be input into log anomaly aggregation process 204.

As illustrated, the log anomaly aggregation process 204 may include may include two phases in the log anomaly aggregation process. The first phase 204 merges log anomaly instances 212 which are the outputs of the log anomaly detector 202 into log anomaly classes 214, where each anomaly class represents an unique kind of anomalous log pattern that may appear multiple times in the log data 210 when an operational issue occurs. The log anomaly classes 214 may then be passed to the second aggregation phase 206, which merges log anomaly classes into log anomaly showcases 216, where multiple log anomaly classes 214 are grouped together as a single showcase 216 if they can be demonstrated together using the same sample log event. The log anomaly showcase 216 may then be output, such as via a user interface to a client device 208, to enable the operator of the client device to more readily examine log anomalies generated by the monitored application or process. An example data structure of a log anomaly class will be described in greater detail below in reference to FIG. 5. Additionally, an example data structure of a log anomaly showcase or group will be described in greater detail below in reference to FIG. 6.

Figure 3:
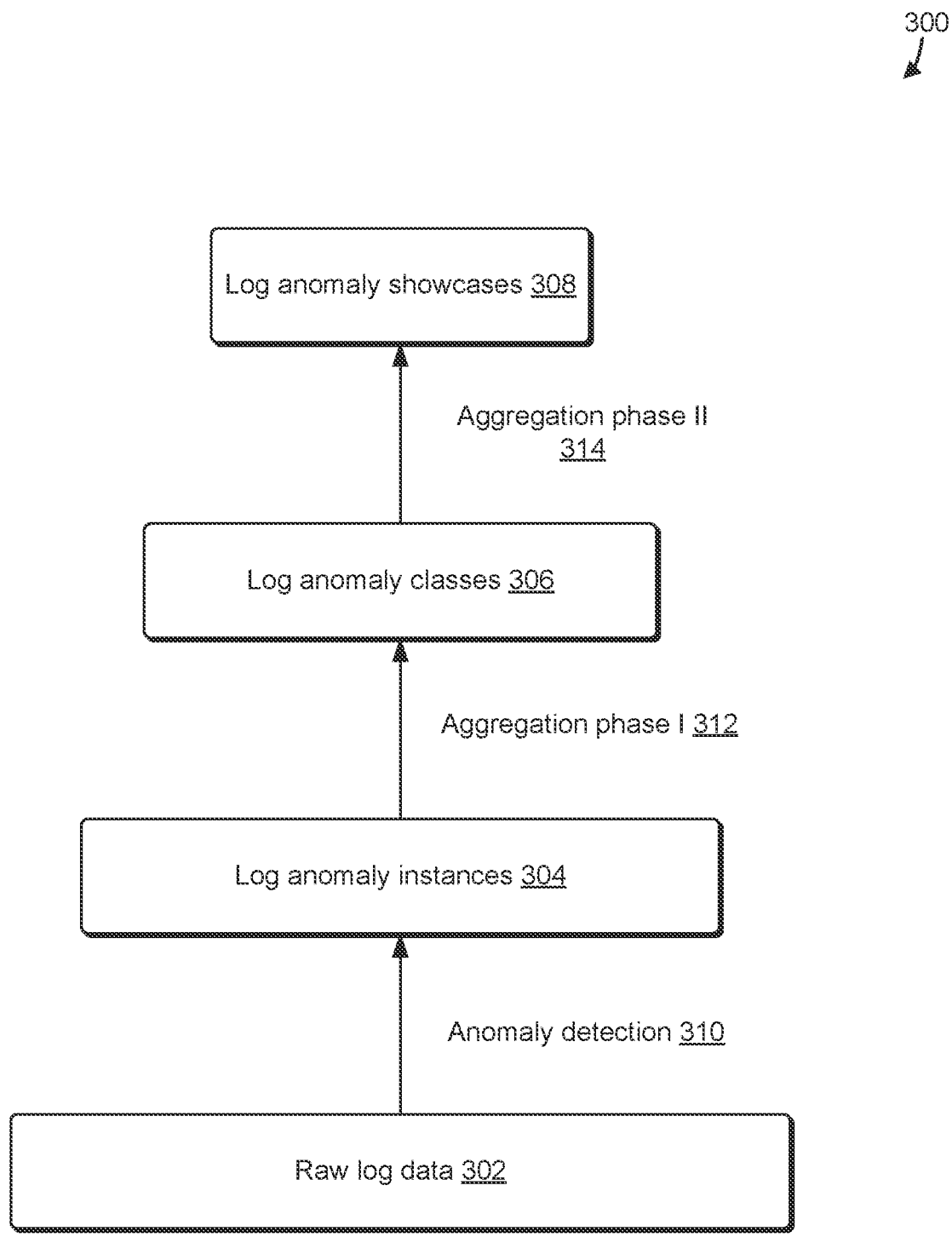
FIG. 3 illustrates an example diagram of a hierarchy of different groupings of log anomaly instances, as may be utilized to aggregate log anomalies, according to at least one embodiment.

FIG. 3 illustrates an example diagram of a hierarchy 300 of different groupings of log anomaly instances, as may be utilized to aggregate log anomalies. In some cases, hierarchy 300 may be untiled by the log anomaly analysis service 100 and/or process 200 described above in reference to FIGS. 1 and 2.

FIG. 3 illustrates a hierarchy 300 in representing log information which contains 4 levels from the bottom-up: raw log data 302, log anomaly instances 304, log anomaly classes 306, and log anomaly showcases 308. Each layer in the hierarchy 300 may be generated by a manipulation of a layer below. As illustrated, raw log data 302 may undergo an anomy detection process 310, which may filter the raw log data 302 to output a subset of the raw log data, represented by log anomaly instances layer 304. The log anomaly instances layer 304 may undergo a first phase of log anomaly aggregation 312, to provide a set of log anomaly classes 306. The log anomaly classes layer 306 may undergo a second phase on log anomaly aggregation, which may produce one or more log anomaly showcases 308. As illustrated, each level up in the hierarchy 300 represents log information that an operator may find useful for trouble-shooting in a more compact and condensed way than the layer below (e.g., representing the same data, e.g. log anomalies, in ultimately less data). The described hierarchy 300 may be utilized by and/or form the basis of the described two-phase log anomaly information aggregation process, which may be generic, such that it has no dependency on any specific type of log anomaly detector used in practice. The proposed aggregation framework also features the utilization of a log parser, such as log parser 118, to generate event type ID if it is not provided in the anomaly detector's output.

Various different anomaly detector or detection services, such as service 120 and/or detector 210, may be utilized in the described techniques. In some cases, the log detector may output log anomaly instances having one or more of the following data fields. FIG. 4 illustrates an example data structure 400 of a log anomaly instance 402. Example log anomaly instance 402 may include the following fields: log anomaly type 404; log anomaly sub-type 406 (optional in some cases); timestamp 408 (optional in some cases); anomalous log event 410, such as including the original log event where anomaly is detected; event type ID 414 (optional in some cases), which indicates the event type of the anomalous log event; and anomalous token location 414 (optional in some cases), which may indicate the location of the token where anomaly is detected in the log event. Example log anomaly instance 402 includes the following values for each of the data fields:

Log anomaly type 404: Keyword anomaly
Log anomaly sub-type 406: AccessDeniedException
Timestamp 408: 1658971260000'
Anomalous log event 410: 'botocore.exceptions.ClientError: An error occurred (AccessDeniedException) when calling theFilterLogEvents operation'
Event type ID 12: kj390dfs
Anomalous token location 414: kj390dfs[4][0]

The above example may include a log anomaly as there is 'AccessDeniedException' contained in the log line which indicates that the access was denied when calling the 'FilterLogEvents' API to given monitored application or service . . .

For illustration purposes, here is another example of a valid anomaly instance:

Log anomaly type 404: Numerical point anomaly
Log anomaly sub-type 406: Above
Timestamp 408: '1658971260000'
Anomalous log event 410: 'REPORT RequestId: 3c21262e-6385-5910-80f4-7db3c712bc9a Duration: 57423.75 ms'
Event type ID 412: au90dfv
Anomalous token location 414: au90dfv[4]

In the above example, the detected anomaly may be that the numerical value 57423.75 is above its historical distribution.

Again, the above examples are just for illustration purpose In some cases, the 'Log anomaly type', 'Log anomaly sub-type' and/or other values may vary depending on the specific log anomaly detector utilized. In some cases, the way to represent the optional fields 'Event type ID' and 'Anomalous token location' may also vary depending on the specific log anomaly detector.

FIG. 5 illustrates an example data structure 500 of a log anomaly class. In one example, a log anomalous class 502 may include one or more of the following data fields: anomaly class ID 404: in some cases may be unique class ID for each combination of one or more of 'log anomaly type', 'log anomaly sub-type', 'event type id', and 'anomalous token location' (if applicable); log anomaly type 506: which may be the same as the 'log anomaly type' of a log anomaly instance that is part of the class; log anomaly sub-type (optional) 508: which may be the same as the 'log anomaly sub-type of t a log anomaly instance that is part of the class; event type ID (optional) 510: obtained from the anomaly instance or generated using an online log parser; occurrence count 512: may be initialized as 1 and may indicate the total number of log anomaly instances contained in the class; first appearance timestamp 514: initialized as the 'timestamp' of the first log anomaly instance contained in the class; log event sample 516: initialized as the 'anomalous log event' of the log anomaly instance.

FIG. 6 illustrates an example data structure of a log anomaly showcase or group 600. Example log anomaly showcase 602 may represent a group of anomaly classes that can be shown together using the same sample log event. Log anomaly showcases are the aggregated format of log anomaly information that may be presented to users. In some examples, the attributes of an anomaly showcase may include one or more of the following: anomaly showcase ID 604: a unique ID for the showcase 602 (in some cases, the showcase ID may be generated from a hash value from the 'Log event sample'); log event sample 606 (same as described above); first appearance timestamp 608 (same as described above); occurrence count 610: number of occurrences of anomaly instance of showcase; and anomaly class list 612: a list of anomaly classes that are grouped into this anomaly showcase 602.

Figure 7:
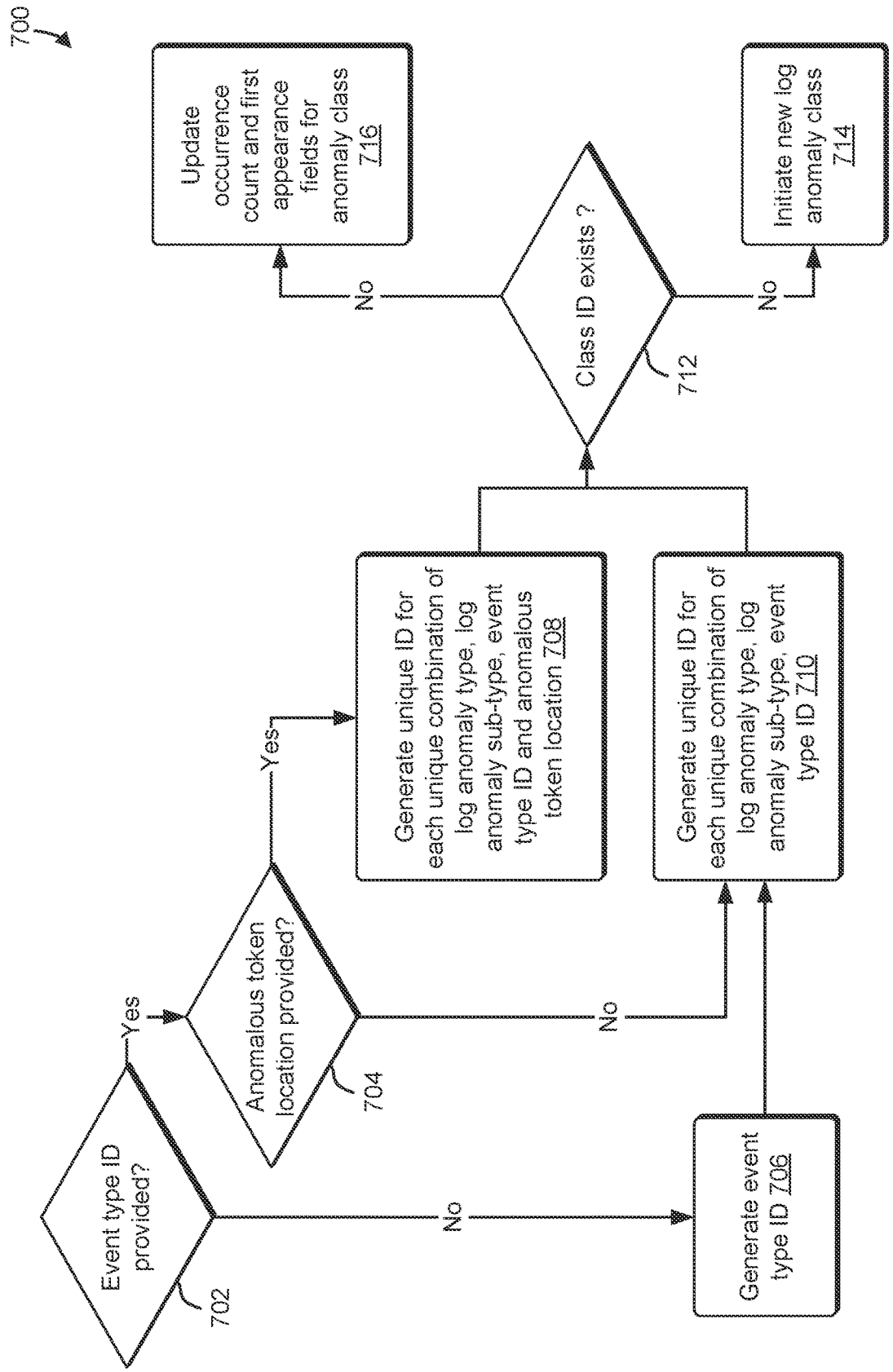
FIG. 7 illustrates an example process for performing a first phase of aggregating log anomalies, such as may be performed by the system of FIG. 1, according to at least one embodiment.

FIG. 7 illustrates an example process 700 for performing a first phase of aggregating log anomalies. In some cases, process 700 may be performed by the log anomaly analysis service 110 described above in reference to FIG. 1. In a specific example, process 700 may be performed by one or more component of the log anomaly analysis service 110, such as by the log anomaly aggregator 112, the log anomaly class aggregator 114, and/or the log parser 118. In some cases, process 700 may be example of operation 204 described above in reference to process 200 of FIG. 2.

Process 700 may be performed on one or more log anomaly instances 716 received by the system. Process 700 begin at operation 702, in which it may be determined of an event ID is provided for a given log anomaly instance. If yes, then process 700 may proceed to operation 704, where it may be determined if an anomalous token location is provided with the log anomaly instance. If yes, the process 700 may continue to operation 708, where a unique ID may be generated to indicate the anomaly class ID. In some examples, the unique ID may be a combination of or include one or more of the log anomaly type, log anomaly sub-type, event type ID, and/or anomalous token location of the log anomaly instance. Going back to operation 702, if an event type ID does not exist for a given log anomaly instance, then an event type ID may be generated at operation 706. Process may then proceed to operation 710, in which a unique ID, which may be used as the class ID, may be generated. The unique ID generated in operation 710 may be a combination of or include one or more of the log anomaly type, log anomaly sub-type, and/or event type ID of the log anomaly instance. Going back to operation 704, if no anomalous token location is provided with the log anomaly instance, then process 700 may proceed to operation 710.

Following operation 708 and 710, process 700 may proceed to operation 712, in which it may be determined if the generated class ID, at either of operations 708 or 710, exists in the system. If not, then a new log anomaly class using the unique class ID may be generated at operation 714, and may be initialized to include the subject log anomaly instance. If, however, at operation 712, the unique class ID does exist in the system, the occurrence value in that existing class record may be updated, along with the first appearance or occurrence field, if applicable.

It should be appreciated that process 700 is only given by way of example. Different attributes of log anomaly instances may be sued to identify which log anomaly instances can be combined into ca class or other data structure.

In some examples, the first phase aggregation process 700 merges log anomaly instances from the log anomaly detector to form log anomaly classes. A log anomaly class may be used to represent a specific kind of anomalous log pattern that may appear multiple times in the log data. Depending on whether 'event type ID' and 'Anomalous token location' information exists in the log anomaly instances, the way to perform aggregation may vary.

The anomaly class ID generation step can take any method in practice as long as it guarantees the uniqueness of the ID for each possible combination of attributes of the common log anomaly instances in the class. For instance, one simple way to generate a unique class ID is concatenating the following values or attributes:

[Log_anomaly_type]_[anomaly_sub_type]_[event_type_id]_[anomalous_token_location]

When 'event type ID' is not provided in the log anomaly instances, a log parser may be used to generate the 'event type ID'. In practice, the log anomaly classes can be represented by a dictionary-like data structure with a number of following key-value pairs, such as he fields described above in reference to FIG. 5.

One example of updating an anomaly class with an anomaly instance is provided below:
  INPUT: an anomaly_instance, an anomaly class to update
  OUTPUT: updated anomaly class
    anomaly_class.occurrence_count=anomaly_class.
    occurrence_count+1
    anomaly_class.first_appearance=min (anomaly_
    class.first_appearance, anomaly_instance.

Figure 8:
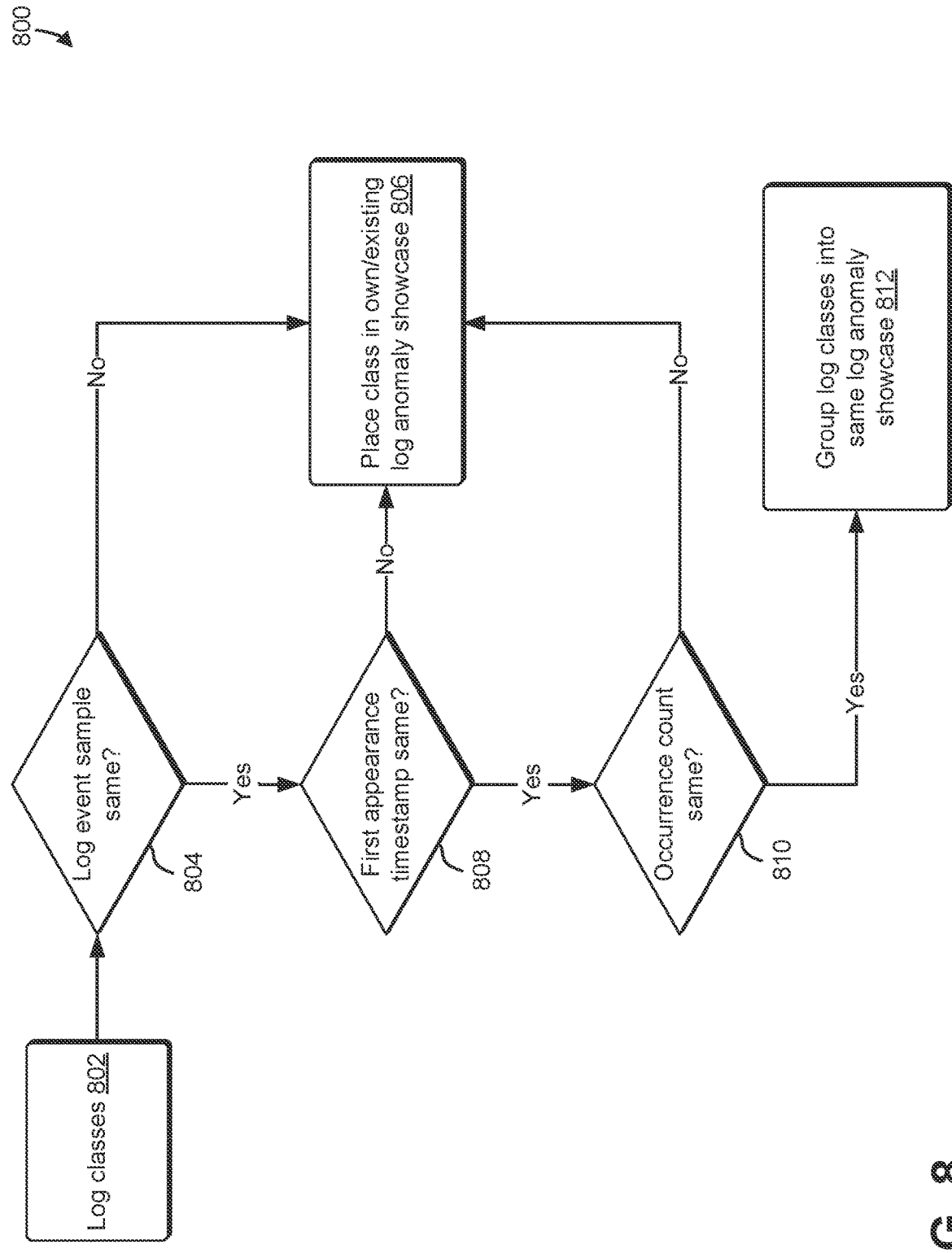
FIG. 8 illustrates an example process for performing a second phase of aggregating log anomalies, such as may be performed by the system of FIG. 1, according to at least one embodiment.

FIG. 8 illustrates an example process 800 for performing a second phase of aggregating log anomalies. In some cases, process 800 may be performed by the log anomaly analysis service 110 described above in reference to FIG. 1. In a specific example, process 800 may be performed by one or more component of the log anomaly aggregator 110, such as by the log anomaly aggregator 112, the log anomaly showcase aggregator 116, and/or the log parser 118. In some cases, process 800 may be example of operation 206 described above in reference to process 200 of FIG. 2.

Process 800 may begin at operation 804, in which obtained log classes 802 may be compared to determine if any the log classes contain the same log event sample. If the log event sample between log anomaly classes is the same, as determined at operation 804, then process 800 may proceed to operation 808, in which it may be determined if the first appearance time stamp associated with the log classes 802 is also the same. If yes, process 800 may proceed to operation 810, in which it may be determined if the occurrence count of the log anomaly instance in the each class is the same. If the determination at operation 810 is yes, then process 800 may proceed to operation 812, in which the log classes may be grouped into the same log anomaly showcase or group. If however, any of the determinations at operations 804, 808, or 810 is negative, then process 800 may proceed to operation 806, in which the log classes may be placed in their own log anomaly showcase. In some cases, operation 806 may additionally include looping back to operation 804, to compare the log classes to other log classes, to see if other showcases should be formed or the log classes assigned to other anomaly showcases.

The phase II aggregation process 800 group log anomaly classes from phase I aggregation into log anomaly showcases. In one example, anomaly classes are grouped into the same anomaly showcase if they meet following conditions: 1) their 'Log event sample' are identical; 2) their 'First appearance timestamp' are identical; and 3) their 'Occurrence count' are identical. A log anomaly showcase represents a group of anomaly classes that can be shown together using the same sample log event. Log anomaly showcases are the aggregated format of log anomaly information that we surface to the users. An example set of attributes of an anomaly showcase is described above in reference to FIG. 6.

Figure 9:
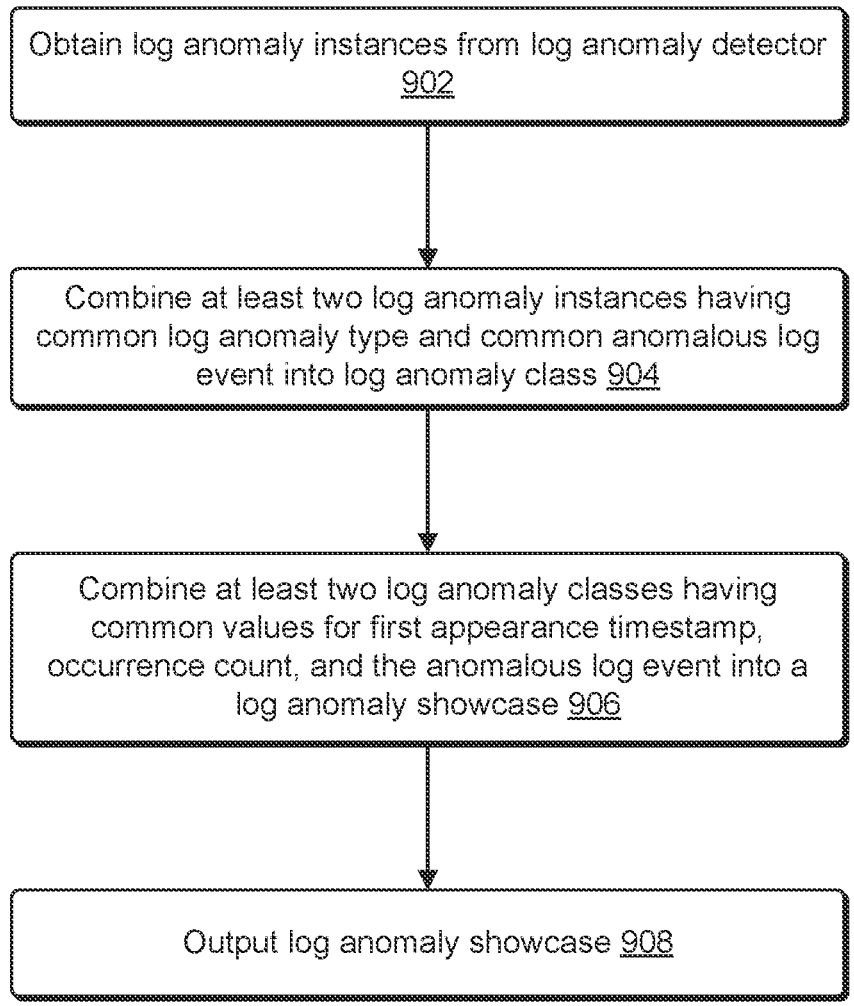
FIG. 9 illustrates another example process for aggregating log anomalies into one or more groups or showcases, such as may be performed by the system of FIG. 1, according to at least one embodiment.

FIG. 9 illustrates another example two phase process 900 for aggregating log anomalies into one or more groups or showcases. In some cases, process 900 may be performed by the log anomaly analysis service 110 described above in reference to FIG. 1. In a specific example, process 900 may be performed by one or more component of the log anomaly analysis service 110, such as by the log anomaly aggregator 112, the log anomaly class aggregator 114, the log anomaly showcase aggregator 116, and/or the log parser 118.

In some examples, process 900 may begin at operation 902, in which log anomaly instances may be obtained, such as from a log detector, such as described in greater detail above. In some cases, the log anomaly instances may contain or include indications of a first log anomaly type and a first anomalous log event to which the log anomalies instances are associated.

Next, at operation 904 at least two log anomaly instances having common log anomaly type and common anomalous log event may be combined into a log anomaly class. Log anomaly classes may represent a collection of occurrences of the first anomalous log event associated with the first log anomaly type.

In some cases, individual log anomaly instances may be associated a timestamp indicating a time at which the an anomalous log event occurred. In these examples, each of the log anomaly classes may associated with a first appearance timestamp that is determined based at least in part on the timestamps of the log anomaly instances aggregated into a given log anomaly class. In yet some cases, individual log anomaly instances may include an event type ID that indicates an event type of the anomalous log event. In these examples, log anomaly instances associated with the first log anomaly type, the first anomalous log event and the same event type ID may be combined into a given log anomaly class. In yet some cases, upon determining that a log anomaly instance does not include an event type ID, an event type ID may be generated for the log anomaly instance (such as by a log parser) and associated with the log anomaly instance. In yet some cases, individual log anomaly instances also include a field for log anomaly sub-type, such that log anomaly instances having the same log anomaly sub-type may be combined into the a given log anomaly class.

At operation 906, at least two log anomaly classes having common values for first appearance timestamp, occurrence count, and/or the anomalous log event may be combined into a log anomaly group or showcase. In some cases, as described in greater detail above, the log anomaly group correlates the occurrences of the first anomaly type and the second anomaly type to the same first anomalous log event over a period of time.

At operation 908, the log anomaly showcase may be output, such as through a GUI presented to a user device associated with the initial request to perform the log aggregation. In some cases, process 900 may additionally include obtaining a selection of an aggregation level corresponding to plurality of log anomaly instances, where the aggregation level includes one of log anomaly class level aggregation or log anomaly group aggregation. Responsive to obtaining the selection, an indication of at least one of the first log anomaly class, the second log anomaly class, or the log anomaly group may be output based on the selection. In yet some cases, the indication of the log anomaly group may include expandable indications of the first log anomaly class and the second log anomaly class.

In some cases, process 900 may additionally or alternatively include determining an occurrence count of an log anomaly instance for each of the plurality of log anomaly classes, where the occurrence count indicates how many times the anomalous log event occurred for each of the plurality of log anomaly classes. In these example's log classes grouped into a single showcase may have the same occurrence count.

Figure 10:
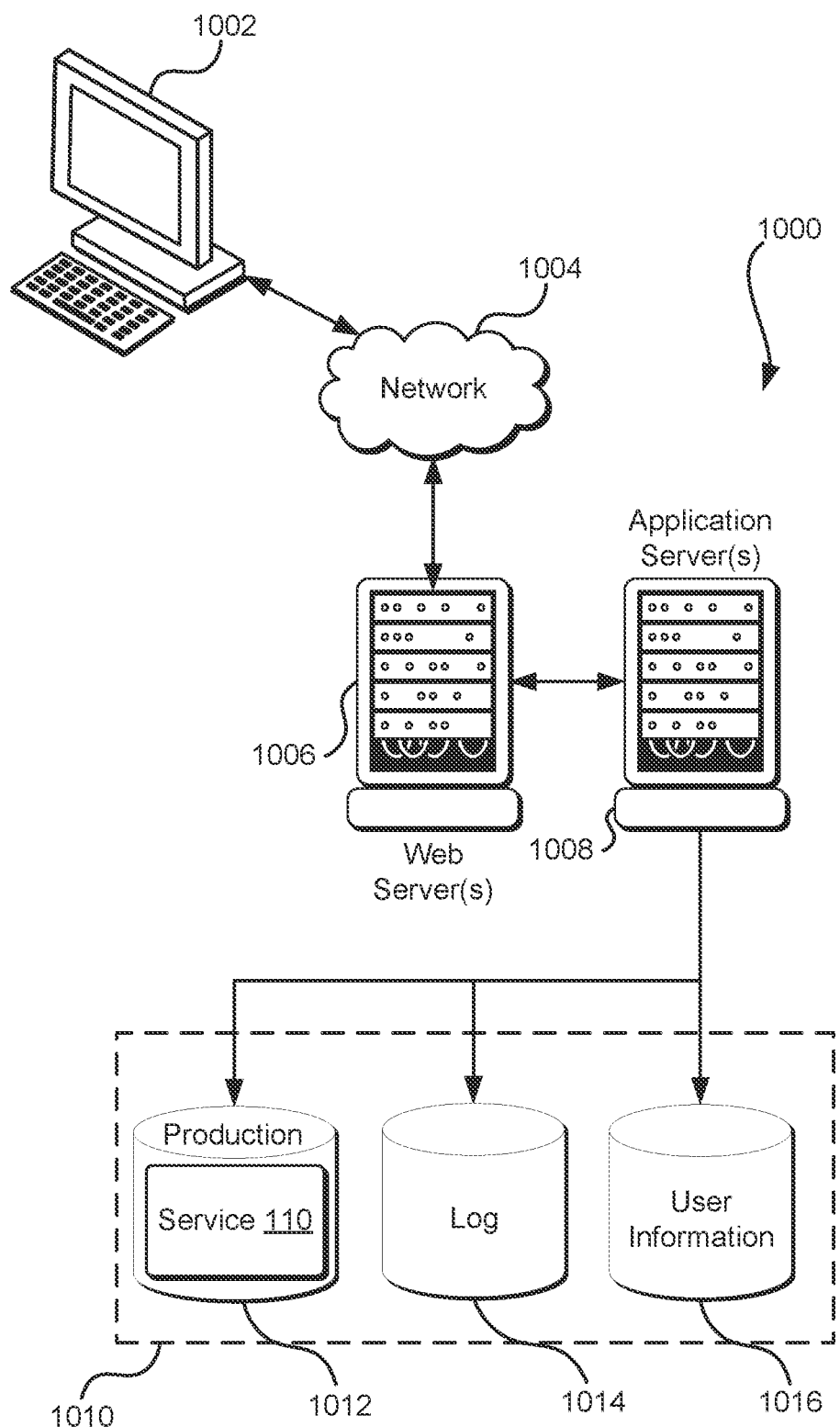
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

In some examples, the application server(s) 1008 may host a log anomaly analysis service, such as service 110 as described above. The log anomaly analysis service may obtain log anomaly event data, which may be store or obtained from data store 1010.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method for aggregating anomalous log entries, comprising:
    obtaining a set of log anomaly instances from a log anomaly detector, individual log anomaly instances comprising a log anomaly type and an anomalous log event;
    performing a first aggregation phase by combining at least two log anomaly instances associated with a first log anomaly type and a same first anomalous log event into a first log anomaly class of a plurality of log anomaly classes, wherein the first log anomaly class comprises a first appearance timestamp indicating a first initial time at which the first anomalous log event first occurred and a first occurrence count indicating how many times the first anomalous log event occurred;
    performing another first aggregation phase by combining at least two log anomaly instances associated with a second log anomaly type and a same second anomalous log event into a second log anomaly class of the plurality of log anomaly classes, wherein the second log anomaly class comprises a second appearance timestamp indicating a second initial time at which the second anomalous log event first occurred and a second occurrence count indicating how many times the second anomalous log event occurred;
    performing a second aggregation phase by combining at least the first log anomaly class and the second log anomaly class into a log anomaly showcase based on the first log anomaly class and the second log anomaly class sharing a same value for one or more of: the first appearance time stamp and the second appearance time stamp, the first occurrence count and the second occurrence count, or the first anomalous log event and the second anomalous log event, the log anomaly showcase representing the occurrences anomalous log events that are associated with at least two different log anomaly types over a period of time in a condensed format; and
    outputting an indication of the log anomaly showcase.

2. The computer-implemented method of claim 1, wherein individual log anomaly instances further comprise an event type ID that indicates an event type of the anomalous log event, and wherein performing the first aggregation phase further comprises:
    combining at least two log anomaly instances associated with the same first log anomaly type, the same first anomalous log event and the same event type ID into one of the plurality of log anomaly classes.

3. The computer-implemented method of claim 2, further comprising:
    upon determining that a log anomaly instance does not comprise an event type ID, causing a log parser to generate an event type ID for the log anomaly instance and associating the event type ID with the log anomaly instance.

4. The computer-implemented method of claim 2, further comprising:
    generating a recommendation to correct the anomalous log events summarized in the log showcase.

5. The computer-implemented method of claim 1, wherein individual log anomaly instances further comprise a timestamp indicating a time at which the anomalous log event occurred, and wherein the first appearance timestamp of each of the log anomaly classes is determined based at least in part on the timestamps of the log anomaly instances aggregated into each of the log anomaly classes.

6. The computer-implemented method of claim 5, further comprising: generating and associating a class ID with each of the plurality of log anomaly classes, wherein the class ID is unique for each combination of the first appearance timestamp, the occurrence count, and the event type ID, and wherein the log anomaly showcase comprises at least two log anomaly classes associated with different class IDs.

7. A system, comprising:
    one or more processors; and
    memory that stores computer-executable instructions that, if executed, cause the one or more processors to:
        obtain a plurality of log anomaly instances from a log anomaly detector, individual log anomaly instances of the plurality of log anomaly instances indicating a first log anomaly type and a first anomalous log event;
        combine at least two of the log anomaly instances associated with the first log anomaly type and the first anomalous log event into a first log anomaly class of a plurality of log anomaly classes, wherein the first log anomaly class represents a collection of occurrences of the first anomalous log event associated with the first log anomaly type;
        combine the first log anomaly class and a second log anomaly class of the plurality of log anomaly classes into a log anomaly group, wherein the second log anomaly class comprises a at least two log anomaly instances associated with the first anomalous log event and a second log anomaly type, wherein the log anomaly group correlates the occurrences of the first anomaly type and the second anomaly type to the same first anomalous log event over a period of time; and
        output an indication of the log anomaly group.

8. The system of claim 7, wherein individual log anomaly instances further comprise an event type ID that indicates an event type of the anomalous log event, and wherein the instructions that, if executed, cause the one or more processors to combine the at least two of the log anomaly instances into the first log anomaly class further comprise instructions, if executed, cause the one or more processors to:
    combine at least two log anomaly instances associated with the first log anomaly type, the first anomalous log event and the same event type ID into the first log anomaly classes.

9. The system of claim 8, the memory stores additional computer-executable instructions that, if executed, cause the one or more processors to:
    upon determining that a log anomaly instance does not comprise an event type ID, generate an event type ID for the log anomaly instance and associating the event type ID with the log anomaly instance.

10. The system of claim 9, wherein the memory stores additional computer-executable instructions that, if executed, cause the one or more processors to:
    obtain a selection of an aggregation level corresponding to plurality of log anomaly instances, the aggregation level comprising one of log anomaly class level aggregation or log anomaly group aggregation; and
    output an indication of at least one of the first log anomaly class, the second log anomaly class, or the log anomaly group based on the selection.

11. The system of claim 7, wherein individual log anomaly instances further comprise a timestamp indicating a time at which the an anomalous log event occurred, and wherein each of the log anomaly classes is associated with a first appearance timestamp associated with anomalous log event, wherein the first appearance timestamp is determined based at least in part on the timestamps of the log anomaly instances aggregated into each of the log anomaly classes.

12. The system of claim 7, wherein the indication of the log anomaly group comprises expandable indications of the first log anomaly class and the second log anomaly class.

13. The system of claim 7, herein the memory stores additional computer-executable instructions that, if executed, cause the one or more processors to:
   determine an occurrence count of an log anomaly instance for each of the plurality of log anomaly classes, the occurrence count indicating how many times the anomalous log event occurred for each of the plurality of log anomaly classes;
   and wherein the first log anomaly class and the second log anomaly class are each associated with the occurrence count.

14. The system of claim 7, wherein individual log anomaly instances further comprise a log anomaly sub-type, and wherein the at least two of the log anomaly instances that are combined into the first log anomaly class are each associated with a first log anomaly sub-type.

15. A non-transitory computer-readable storage medium storing thereon executable instructions that, as a result of being executed by one or more processors of a computer system, cause the computer system to at least:
   obtain a plurality of log anomaly instances from an application, individual log anomaly instances of the plurality of log anomaly instances indicating a first log anomaly type and a first anomalous log event;
   combine at least two of the log anomaly instances associated with the first log anomaly type and the first anomalous log event into a first log anomaly class of a plurality of log anomaly classes, wherein each of the plurality of log anomaly classes including the first log anomaly class each represent a collection of occurrences of the same first anomalous log event associated with the first log anomaly type;
   combine the first log anomaly class and a second log anomaly class of the plurality of log anomaly classes into a log anomaly group, wherein the second log anomaly class comprises a at least two log anomaly instances associated with the first anomalous log event and a second log anomaly type, wherein the log anomaly group represents the occurrences of the first anomaly type and the second anomaly type corresponding to the same first anomalous log event over a period of time; and
   output an indication of the log anomaly group.

16. The non-transitory computer-readable storage medium of claim 15, wherein individual log anomaly instances further comprise an event type ID that indicates an event type of the anomalous log event, and wherein the instructions that cause the computer system to combine the at least two of the log anomaly instances into the first log anomaly class further comprise additional instructions, that cause the computer system to:
   combine at least two log anomaly instances associated with the first log anomaly type, the first anomalous log event and the same event type ID into the first log anomaly classes.

17. The non-transitory computer-readable storage medium of claim 16, wherein the instructions comprise additional instructions, that cause the computer system to:
   generate the event type ID for at least some of the plurality of the log anomaly instance and associate the event type ID with the at least some of the plurality of the log anomaly instances.

18. The non-transitory computer-readable storage medium of claim 17, wherein the instructions comprise additional instructions, that cause the computer system to:
   generate and associate a class ID with each of the plurality of log anomaly classes, wherein the class ID is unique for each combination of the first appearance timestamp and the event type ID.

19. The non-transitory computer-readable storage medium of claim 18, wherein the log anomaly group comprises at least two log anomaly classes associated with different class IDs.

20. The non-transitory computer-readable storage medium of claim 15, wherein individual log anomaly instances further comprise a timestamp indicating a time at which the an anomalous log event occurred, and wherein each of the log anomaly classes is associated with a first appearance timestamp associated with an anomalous log event, wherein the first appearance timestamp is based at least in part on the timestamps of the log anomaly instances aggregated into each of the log anomaly classes.

* * * * *